Feb. 15, 1955   L. J. ANDERSON   2,701,919
SAMPLING AND GAUGING DEVICE
Filed Sept. 11, 1950
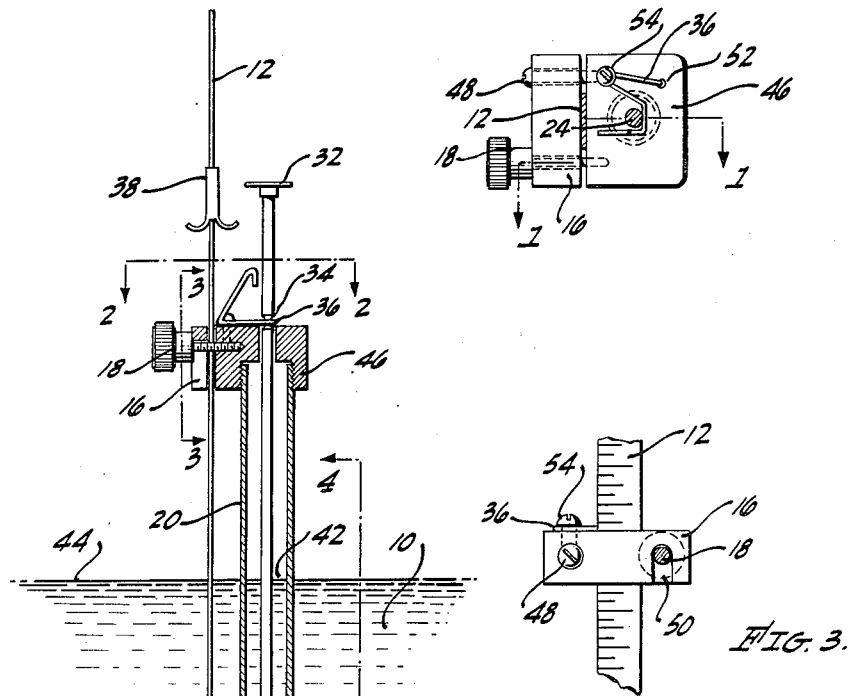
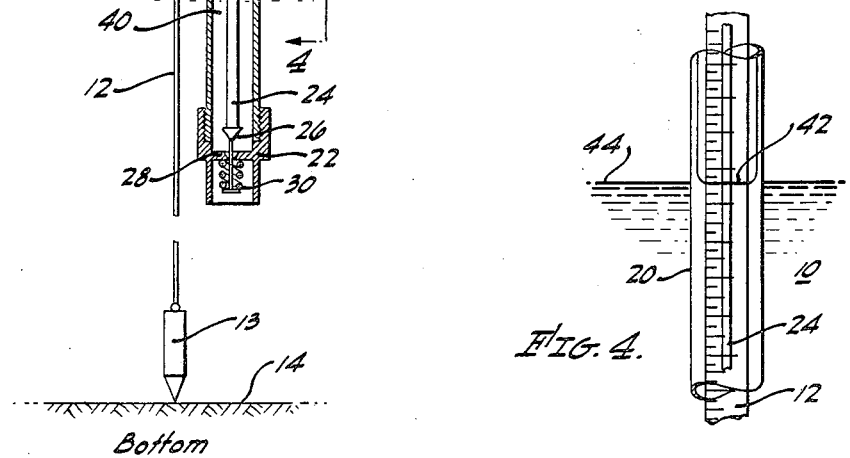
INVENTOR.
LEONARD J. ANDERSON,
BY
AGENT.

United States Patent Office 2,701,919
Patented Feb. 15, 1955

2,701,919

SAMPLING AND GAUGING DEVICE

Leonard J. Anderson, Glendale, Calif., assignor to Union Oil Company of California, Los Angeles, Calif., a corporation of California Application September 11, 1950, Serial No. 184,196

3 Claims. (Cl. 33—126.4)

This invention relates to an improved apparatus for the interface sampling and gauging of liquids contained in containers such as storage and operating tanks, ships, and the like and in particular relates to the sampling and gauging of liquids of relatively high volatility with improved accuracy and decreased expenditure of time.

In the determination of the height or depth of fluids in containers in the absence of liquid level indicator instruments and where quantities of liquids are to be measured in tanks for sales purposes, the conventional procedure is to lower a plumb bob gauging tape to the bottom of the tank. The tape or rod or other measuring device is then withdrawn and the depth of liquid determined by locating on the tape the level to which the fluid has wet the tape. For heavy oils and other fluids which do not readily evaporate this procedure is probably the simplest, most economical, and reasonably accurate. From the dimensions of the tank the quantity of the fluid is readily calculated once knowing the depth of the liquid and a gauge chart is prepared from which the liquid volume is given in any desired units as a function of liquid depth.

Difficulties are encountered, however, in employing this procedure in the gauging of tanks or other containers containing volatile fluids such as aviation and other gasolines and light liquid solvents such as alcohols, ketones, and the like. Also such a method of gauging is of increased difficulty at night or otherwise in poor light. The principal difficulty results from the fact that the liquid clinging to the surfaces of the tape readily evaporates upon being withdrawn from the fluid. This evaporation occurs particularly at the line of demarcation on the tape between the wet and dry area so that by the time the tape is withdrawn and a reading of the liquid depth attempted the line of demarcation is often obliterated. In many cases this line of demarcation tends to rise above its actual level due to capillary action or falls due to gravity flow before being recorded. This makes it impossible to obtain accurate readings of the quantity of fluid present.

The present invention, therefore, is directed to an improved apparatus for gauging of tanks which prevents the evaporative phenomenon from interfering with the determination of the liquid depth when using a tape, calibrated rod, etc.

It is an object of the present invention to provide an improved apparatus for the gauging and sampling of liquids contained in tanks or other vessels.

Another object of the present invention is to provide a simple device to be employed in conjunction with a conventional gauger's tape or other measuring device such as a wooden rod, etc., for the determination of the depth of volatile fluids in storage tanks.

A more specific object of the present invention is to provide a device containing a sight gauge which is attachable to a gauger's tape and within which sight gauge a liquid meniscus is formed and opposite which meniscus the level of the fluids in the tank is read on the tape.

Other objects and advantages of the present invention will become apparent to those skilled in the art as the description thereof proceeds.

Briefly, the present invention comprises an apparatus consisting of a transparent sight gauge provided at its lower extremity with a normally closed spring-loaded inlet valve. The sight gauge assembly is provided with means for clamping it adjacent and parallel to a gauger's tape so that the tape and sight gauge may be lowered into the body of liquids contained in a storage tank and the calibration of the tape may be read through the gauge. The sight gauge assembly is clamped on to the tape at a predetermined point so that the interface at the surface of the liquid in the tanks intersects the sight gauge at an intermediate point. The apparatus is further provided with a small falling weight slidably mounted on the tape, rod or other height or depth indicating device and adapted to close the inlet valve at the bottom extremity of the sight gauge thereby trapping a small quantity of fluid therein. Upon withdrawing the tape and sight gauge assembly from the tank the liquid level is determined by reading the calibration on the tape opposite the liquid meniscus in the sight gauge.

The operation and a full description of the device according to the present invention are presented below in connection with the accompanying drawings in which:

Figure 1 shows an elevation view in cross section of the gauging device according to this invention showing the tape and sight gauge attached thereto, Figure 2 is a plan view of the top of the device showing the clamping device and the retainer spring which holds the inlet valve open, Figure 3 shows an elevation view of the clamping device showing the tape, and Figure 4 shows a liquid level within the sight gauge in position to be read against the gauger's tape.

Referring now more particularly to Figure 1, the device is shown lowered into a body of fluid 10 with the gauger's tape 12 lowered to the tank bottom 14. The gauge assembly is shown attached to the tape 12 by means of clamp 16 which in turn is provided with adjustable thumb screw 18 by means of which clamp 16 is tightened against tape 12. The gauging assembly consists of transparent sight gauge 20 provided at its lower extremity with inlet valve assembly 22. Valve rod 24 extends longitudinally through sight gauge 20 and is provided at its lower end with valve 26 which seats in valve seat 28. The valve is spring loaded by means of spring 30 which holds the valve normally closed. Valve stem 24 is further provided with upper handle 32 and a notch 34 which is provided to engage retainer spring 36 when handle 32 is pulled upward to open the inlet valve.

When valve handle 32 is raised, compressing spring 30, valve plug 26 is pulled away from valve seat 28 opening the lower extremity of sight gauge 20 to permit fluids to enter therethrough. Retainer spring 36 engages notch 34 holding the valve open. It is in this position that the device of the present invention is lowered together with a gauger's tape into a liquid-containing tank to determine the level therein.

In operation it is desirable to preliminarily gauge the tank with or without the device attached to the tape in order to determine the approximate location of the liquid level or interface. After an approximate level is determined the device of the present invention is then located along the tape in such a position that the sight gauge extends from above the generally indicated level to a point below it. After so locating the device on the tape the inlet valve is opened and the tape is again lowered into the tank so that plumb bob 13 strikes tank bottom 14. The device is held in this position for between about 5 and about 30 seconds, 15 seconds being usually sufficient, in order to allow the meniscus 42 to rise in sight gauge 20 to the same height as liquid level 44 in the liquid body 10. Displaced gas escapes from sight gauge 20 through the annular space around valve stem 24 in top assembly 46. Tripper weight 38 is then released and allowed to slide down tape 12 to strike retainer spring 36 in such a fashion that it is disengaged from notch 34. Valve rod 24 is thereby released closing the sight gauge inlet valve. A body of liquid 40 is then contained in the lower portion of sight gauge 20 having a meniscus 42 at the same level as liquid level 44 of liquid body 10 and opposite a calibration on tape 12 which indicates the distance of level 44 from the tank bottom.

The entire device is then withdrawn from liquid body 10 and the depth of the fluid in the storage tank is determined by sighting across the meniscus 42 against tape 12 through the sight glass as indicated later in Figure 4.

It is often very convenient to then drain the liquid contained in the sight glass into a sample bottle as a sample of the liquid present at the interface between the liquid body and the adjacent vapor phase.

When gauging volatile fluids any interface formed upon the surface of tape 12 has a strong tendency to be obliterated due to the combined effects of evaporation, capillary rise, and the gravity flow of the low viscosity fluid down the tape. Within the sight glass, however, the tendency for the evaporative effect is minimized and no gravity flow is possible since the inlet valve is closed. A highly accurate and satisfactory reading of the liquid level is hereby obtained.

Referring now more particularly to Figure 2, a plan view of the upper part of the gauging device of the present invention is shown. Tape 12 is shown in cross section tightly held between top assembly 46 and movable clamp 16 described in Figure 1. Clamp 16 is pivoted about bolt 48 and thumb screw 18 extending through slot 50 is employed to tighten clamp 16 against the tape. Retainer spring 36 is secured by means of aperture 52 and bolt 54 and is compressed in sliding contact against valve rod 24. As indicated in Figure 1, retainer spring 36 engages notch 34 in the valve rod thereby holding it open against the closing force of spring 30. Upon the impact of a sliding weight 38 against retainer spring 36, the retainer spring is disengaged from the notch allowing the inlet valve to close under the influence of spring 30.

Referring now to Figure 3, an elevation view is shown of clamp 16 and associated parts in position secured to gauging tape 12. Clamp 16 is shown pivoted about bolt 48 which is locked in a nonrotatable position by means of bolt 54 which also secures retainer spring 36 as described above. Thumb screw 18 is shown positioned in slot 50. Upon releasing thumb screw 18, clamp 16 may be pivoted about bolt 48 thereby releasing the gauging device of the present invention from the gauger's tape.

In Figure 4 an elevation view through sight gauge 20 against gauger's tape 12 from the position indicated in Figure 1 is shown. Meniscus 42 within sight gauge 20 is shown surrounding valve rod 24. An elevation of the liquid interface within the tank gauge is determined by reading the level on gauger's tape 12 opposite the position of meniscus 42.

It has been found in the present invention when employing a conventional ½ inch steel gauger's tape for the gauging of gasoline in storage tanks that a sight gauge approximately 6 inches long and ⅝ of an inch outside diameter is satisfactory since in most cases an approximate level within 3 inches either way may be determined preliminarily. It has further been found that a sliding tripper weight weighing about 5 grams is satisfactory to release retainer spring 36 and allow spring 30 to close the inlet valve.

In experimental operation of the device according to the present invention it has been found that more accurate determinations of liquid level were obtainable than heretofore with a gauger's tape alone when high volatility naphtha, gasoline, and solvents were being gauged.

In cases of extremely high volatility liquids where a preliminary level indication is difficult to obtain a longer sight gauge is used with lengths up to 20 or 30 inches long or as long as are found necessary.

For gauging gasoline and hydrocarbon solvents of high volatility a sight gauge fabricated from a transparent plastic tube has been found satisfactory. Breaking is thus minimized and threaded joints with the inlet valve assembly and the top clamping assembly may be made. With other solvents of high volatility such as acetone and others which attack and dissolve the usual transparent plastics, a glass sight gauge is employed.

In one experimental model of the device of the present invention a valve rod and valve seat assembly was fabricated of brass, the clamping and top assemblies were fabricated of aluminum as was the sliding tripper weight.

The sight gauge as well as the thumb screw on the clamp were fabricated of plastic. Satisfactory operation was obtained and no static electricity effects were noted and accurate reproducible level determinations were made in gasoline storage tanks.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. An apparatus for gauging the level of highly volatile fluids within a storage tank which comprises a calibrated elongated measuring device, a transparent sight glass, means for securing said sight glass to said measuring device, a spring-loaded longitudinally acting valve assembly attached to the lower extremity of said sight glass, a valve stem extending from said valve assembly longitudinally through said sight glass and through the upper extremity thereof, a retainer spring engageable with said valve stem and adapted to hold said spring-loaded valve open, and a tripper weight slidably mounted on said calibrated measuring device and adapted to impact and disengage said retainer spring to close said spring-loaded valve.

2. An apparatus for gauging the depth of highly volatile liquids contained in storage tanks which comprises a transparent sight glass, a calibrated weighted gauging tape visible through and along the length of said sight glass, a spring-closing longitudinally acting inlet valve secured to said sight glass at the lower end thereof, a valve stem extending from said inlet valve longitudinally through said sight glass and the top assembly thereof, a retainer spring positioned in said top assembly and positively engageable with said valve stem near the upper end thereof to hold said inlet valve open against the force of the valve-closing spring, clamping means for securing said sight gauge and associated parts to said gauging tape in a position substantially parallel therewith, and a tripper weight slidably mounted on said gauging tape and engageable at the upper end of said sight glass with a part of said retainer spring and adapted to disengage said retainer spring from said valve stem.

3. An apparatus for gauging the depth of highly volatile liquids in storage tanks which comprises a weighted calibrated gauging tape, a gauging tube assembly comprising a transparent cylindrical sight tube provided with a lower spring closing longitudinally acting inlet valve and a top assembly provided with a pivotable clamp for securing said gauging tube to said tape, said inlet valve assembly comprising a valved opening at the lower extremity of said sight tube, a spring adapted to hold said valve in a closed position, a valve stem extending from said valve coaxially through said sight tube and through said top assembly, a retainer spring positioned on said top assembly and engageable with a notch near the upper extremity of said valve stem and adapted to hold said inlet valve open, and a tripper weight slidably mounted upon said tape and adapted to be moved by gravity down said tape to disengage said retainer spring from said valve stem and permit said inlet valve to close.

References Cited in the file of this patent

UNITED STATES PATENTS

| 455,733 | Bell | July 14, 1891 |
| 533,175 | Krouse | Jan. 29, 1895 |
| 1,478,288 | MacGregor | Dec. 18, 1923 |
| 1,560,461 | Barnes | Nov. 3, 1925 |
| 1,938,224 | Remington et al. | Dec. 5, 1933 |
| 2,391,978 | Kahl | Jan. 1, 1946 |

FOREIGN PATENTS

| 12,941 | Austria | Aug. 10, 1903 |
| 16,754 | Denmark | Dec. 9, 1912 |